United States Patent
Kim (10) Patent No.: US 9,560,262 B2
(45) Date of Patent: Jan. 31, 2017

(54) IMAGE PHOTOGRAPHING METHOD, IMAGE PHOTOGRAPHING APPARATUS, AND NON-TRANSITORY RECORDING MEDIUM

(71) Applicant: SAMSUNG ELECTRONICS CO., LTD., Suwon-si, Gyeonggi-do (KR)

(72) Inventor: Hyuck Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/571,820

(22) Filed: Dec. 16, 2014

(65) Prior Publication Data

US 2015/0195450 A1    Jul. 9, 2015

(30) Foreign Application Priority Data

Jan. 3, 2014    (KR) .................... 10-2014-0000769

(51) Int. Cl.
   *H04N 5/232*   (2006.01)
   *H04N 5/235*   (2006.01)
   *H04N 5/262*   (2006.01)

(52) U.S. Cl.
   CPC ...... *H04N 5/23216* (2013.01); *H04N 5/23293* (2013.01); *H04N 5/2355* (2013.01); *H04N 5/2621* (2013.01)

(58) Field of Classification Search
   CPC ............ H04N 5/23216; H04N 5/23293; H04N 5/2355; H04N 5/2621
   USPC ................ 348/333.01, 333.02, 333.05, 333.11, 348/333.12, 231.6, 222.1, 239, 252, 218.1; 715/700, 716, 719
   See application file for complete search history.

(56) References Cited

U.S. PATENT DOCUMENTS

| | | | |
|---|---|---|---|
| 7,034,881 B1 * | 4/2006 | Hyodo | H04N 5/2351 348/231.6 |
| 2009/0225189 A1 * | 9/2009 | Morin | H04N 5/345 348/229.1 |
| 2012/0069212 A1 * | 3/2012 | Imai | H04N 5/142 348/223.1 |
| 2012/0069235 A1 * | 3/2012 | Imai | H04N 5/23212 348/333.11 |
| 2012/0274796 A1 * | 11/2012 | Choi | H04N 5/232 348/220.1 |
| 2014/0146212 A1 * | 5/2014 | Jung | H04N 5/23245 348/333.01 |

* cited by examiner

Primary Examiner — Lin Ye
Assistant Examiner — Marly Camargo
(74) Attorney, Agent, or Firm — Drinker Biddle & Reath LLP (57) ABSTRACT

An image photographing method includes: displaying a live view; receiving a user input for selecting an area of the live view; and in response to a capturing input, applying different capturing option values to the selected area of the live view and an other area of the live view to generate an image.

18 Claims, 11 Drawing Sheets

IMAGE PHOTOGRAPHING METHOD, IMAGE PHOTOGRAPHING APPARATUS, AND NON-TRANSITORY RECORDING MEDIUM

CROSS-REFERENCE TO RELATED APPLICATION(S)

This application claims the priority benefit under 35 U.S.C. §119 from Korean Patent Application No. 10-2014-0000769, filed on Jan. 3, 2014, in the Korean Intellectual Property Office, the disclosure of which is incorporated herein by reference in its entirety.

BACKGROUND

1. Field

Embodiments generally relate to an image photographing method and an image photographing apparatus, and more particularly, to an image photographing method and an image photographing apparatus that show various effects.

2. Description of the Related Art

Most digital cameras that have been recently developed have provided capturing options to acquire capturing effects desired by users.

For example, a user may set a shutter speed or an aperture value to adjust a light amount. The user may also set an International Organization for Standardization (ISO) value to set sensitivity to light. As described above, a recent digital camera may support various types of capturing modes, and the user may actively create a capturing scene through the various photographing modes.

However, these digital cameras may set only an overall effect with respect to one image that is to be captured. The digital cameras may not perform an operation of giving a dynamic effect to some of the parts of the captured image and a static effect to the other parts of the captured image.

Therefore, there is a need for an image photographing method of giving a more detailed effect to a captured image to allow a user to further actively create a desired capturing scene.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide an image photographing method and an image photographing apparatus that apply different capturing option values to respective areas of a captured image to allow a user to further actively create a desired capturing scene.

According to an aspect of the exemplary embodiments, an image photographing method includes: displaying a live view; receiving a user input for selecting an area of the live view; and in response to a capturing input, applying different capturing option values to the selected area of the live view and an other area of the live view to generate an image.

The image photographing method may further include displaying a user interface (UI) for setting the capturing option values with regard to the selected area and the other area of the live view.

The capturing option values may include at least one option value selected from the group consisting of a shutter speed, an aperture value, and an International Organization for Standardization (ISO) value.

The image photographing method may further include displaying a UI for discriminating the selected area and the other area of the live view.

The receiving of the user input for selecting the area of the live view may include: receiving a touch input for a first area of the live view; receiving a drag input that is performed from the first area to a second area of the live view; and setting an area of the live view, including the first and second areas, to an area to which a different capturing option value from a capturing option value applied to the other area of the live view is applied.

The receiving of the user input for selecting the area of the live view may include: receiving a drag input for the live view; and setting an area, which is formed in a looped curve shape or a polygonal shape by the drag input, to an area to which a different capturing option value from a capturing option value applied to the other area of the live view is applied.

The image photographing method may further include performing capturing using the applied different capturing option values, wherein the performing of the capturing includes, in response to the capturing input being received: applying a first capturing option value to capture an image and removing the other area of the live view from the image to which the first capturing option value is applied, to generate a first image; applying a second capturing option value to capture an image and removing the selected area of the live view from the image to which the second capturing option value is applied, to the generate a second image; and synthesizing the first and second images.

According to another aspect of the exemplary embodiments, an image photographing apparatus includes: a display unit that displays a live view; an input unit that receives a user input for selecting an area of the live view; and a controller that, in response to a capturing input, applies different capturing option values to the selected area of the live view and an other area of the live view to generate an image.

The controller may control the display unit to display a UI for setting the capturing option values with regard to the selected area and the other area of the live view.

The capturing option value may include at least one option value selected from the group consisting of a shutter speed, an aperture value, and an ISO value.

The controller may control the display unit to display a UI for discriminating the selected area and the other area of the live view.

The input unit may receive a touch input for a first area of the live view and receive a drag input that is performed from the first area to a second area of the live view. The controller may set an area of the live view, including the first and second areas, to an area to which a different capturing option value from a capturing option value applied to the other area of the live view is applied.

The input unit may receive a drag input for the display unit. The controller may set an area, which is formed in a looped curve shape or a polygonal shape by the drag input, to an area to which a different capturing option value from a capturing option value applied to the other area of the live view is applied.

In response to the capturing input, the controller may apply a first capturing option value to capture an image; remove the other area of the live view from the image to which the first capturing option value is applied, to generate a first image; apply a second capturing option value to capture an image; remove the selected area of the live view from the image to which the second capturing option value is applied, to generate a second image; and synthesize the first and second images.

According to another aspect of the exemplary embodiments, a non-transitory recording medium has recorded thereon a program for performing the image photographing method.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
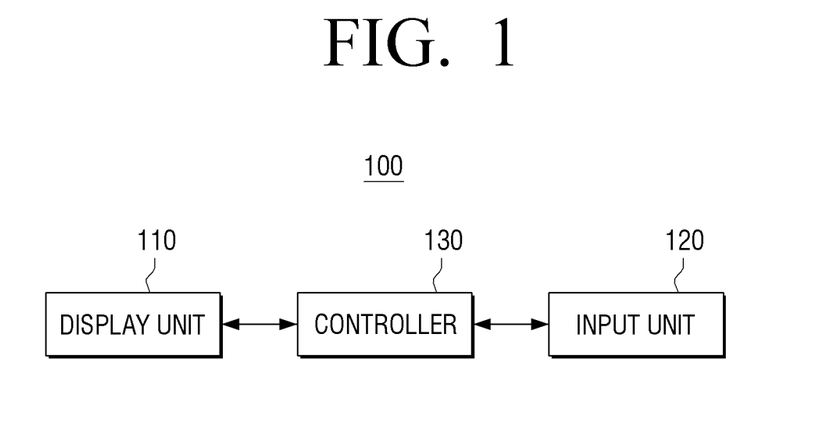
FIG. 1 is a block diagram illustrating a structure of an image photographing apparatus, according to an exemplary embodiment.

FIG. 1 is a block diagram illustrating a structure of an image photographing apparatus 100, according to an exemplary embodiment.

Referring to FIG. 1, the image photographing apparatus 100 according to the present exemplary embodiment includes a display unit 110, an input unit 120, and a controller 130.

The image photographing apparatus 100 may include various types of electronic devices having image capturing functions. For example, the image photographing apparatus 100 may be realized as one of a digital camera, a smartphone, a cellular phone, an MP3, a portable multimedia player (PMP), a tablet personal computer (PC), a laptop computer, smart glasses, and a smart watch.

The display unit 110 is an element that displays an image. The display unit 110 may display a live view or a captured still image and may perform an electronic viewfinder function.

If the image photographing apparatus 100 enters a capturing mode, the display unit 110 captures a subject to display the captured image, which is processed in real time, on live view. In the present embodiment, the live view may be an original image.

The display unit 110 may also display the captured image and an image that is captured and stored. If the image photographing apparatus 100 includes a touch screen as will be described later, a touch screen panel may be compressed on a surface of the display unit 110 to acquire an effect like touching an image displayed on the display unit 110.

The display unit 110 may be manufactured to include the touch screen.

The display unit 110 may be realized as various technologies. For example, the display unit 110 may be realized as various types of display technologies such an organic light-emitting diode (OLED), a liquid crystal display (LCD) panel, a plasma display panel (PDP), a vacuum fluorescent display (VFD), a field emission display (FED), an electroluminescence display (ELD), etc.

The input unit 120 is an element that receives a user input for selecting an area of the display unit 110, e.g., an area of a live view displayed on the display unit 110. The input unit 120 may be realized as various types of technical means. According to an exemplary embodiment, the input unit 120 may include a touch screen. In this case, if there is a touch input of a user with respect to a displayed user interface (UI), the input unit 120 generates a corresponding control command to operate the image photographing apparatus 100. A shutter release button for generating a still image may also be provided as a displayed UI. The user may touch the displayed shutter release button to input a shutter handling (pressing) command or capturing input into the image photographing apparatus 100.

Besides the touch screen, the input unit 120 may include a wheel or a button for controlling the image photographing apparatus 100. The user may control the wheel or the button to select an object displayed on the display unit 110 or perform other user inputs.

The input unit 120 may also be realized to include a shutter release button. The shutter release button may protrude from a housing of the image photographing apparatus 100. If the shutter release button is pressed, the controller 130 that will be described later generates a control command for storing an image displayed on the display unit 110 at that time as a still image, e.g., a capturing input.

The controller 130 controls an overall operation of the image photographing apparatus 100. In particular, if a capturing input (e.g., shutter release input) is received through the input unit 120, the controller 130 applies different capturing option values to the selected area of the display unit 110 and the other area of the display unit 110 to generate an image. In other words, if a first capturing option value is applied to the selected area of a live view displayed on the display unit 110, a second capturing option value different from the first capturing option value may be applied to the other area of the live view except the selected area of the live view to generate an image.

The image photographing apparatus 100 may further include an imaging unit (not shown) that performs capturing under control of the controller 130. The imaging unit includes a shutter, a lens unit, an aperture, and a charge-coupled device (CCD) or complementary metal-oxide-semiconductor (CMOS) image sensor. The shutter and the aperture adjust an amount of exposed light, accumulate the light through a photodiode (PD) of a pixel array of the CCD or CMOS image sensor, and output an electric signal according to the accumulated amount of light. Here, a color filter array (CFA) may be used to acquire a color image. The CFA has a structure in which one pixel passes only light indicating one color, and pixels are regularly arrayed. Therefore, the CFA may have several structures according to array structures. The lens unit includes a zoom lens that zooms a size of an object in and/or out and a focus lens that adjusts a focus of the subject.

The output electric signal is converted into a digital signal through an analog-to-digital converter (ADC). Independent types of processing are performed with respect to a still image and a live view.

Figure 2:
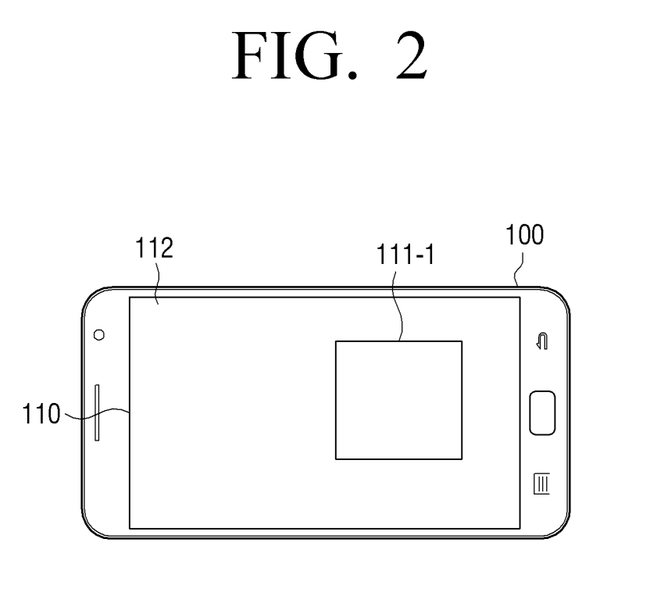
FIG. 2 is a view illustrating a process of applying different capturing option values to respective areas of a display unit, according to an exemplary embodiment.

FIG. 2 is a view illustrating a process of applying different capturing option values to respective areas of a display unit, according to an exemplary embodiment.

As shown in FIG. 2, different capturing option values may be applied to a first area 111-1 and a second area 112 of the display unit 110 to perform capturing. Here, a capturing option value may be at least one of a shutter speed, an aperture value, and an International Organization for Standardization (ISO) value. The shutter and the aperture may adjust an amount of exposed light according to the capturing option values. The electric signal that is output according to the amount of light accumulated by the PD of the pixel array of the CCD or CMOS image sensor is differently amplified according to the ISO value. The electric signal that is converted into the digital signal through the ADC undergoes signal processing such as encoding, etc., and then is stored in a storage unit (not shown).

An area of the display unit 110 may be selected in various shapes. For example, if the image photographing apparatus 100 includes a touch screen, the user may select an area of the display unit 110 through an input for touching the touch screen. In this case, if the user selects the area of the display unit 110, the selected area may have a preset shape. For example, the selected area of the display unit 110 may have a rectangular shape as shown in FIG. 2, but may have different shapes.

Figure 3:
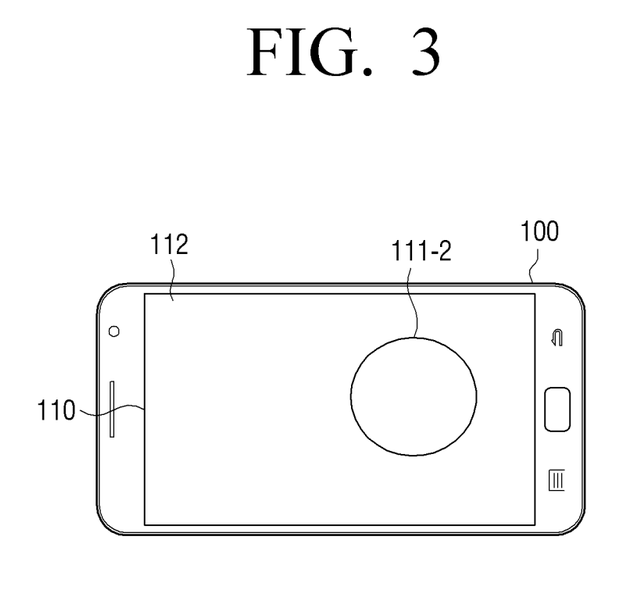
FIG. 3 is a view illustrating a shape of a selected area of a display unit, according to various exemplary embodiments.

FIG. 3 is a view illustrating a shape of a selected area of a display unit, according to various exemplary embodiments.

As shown in FIG. 3, if the user selects an area 111-2 of the display unit 110, the selected area 111-2 may have a circular shape. However, the selected area may have a different shape. A shape of the selected area may vary according to a characteristic of an image that the user wants to capture. According to an exemplary embodiment, the user may perform a user input for selecting a shape of a selectable area in the image photographing apparatus 100.

As described above, a capturing option value may be at least one of a shutter speed, an aperture value, and an ISO value. Therefore, the controller 130 may control to receive a user input for applying a capturing option value to the selected area of the display unit 110 displaying a live view. The controller 130 may display the display unit 110 to display a UI for performing the operation of applying the capturing option value to the selected area of the display unit 110.

Figure 4:
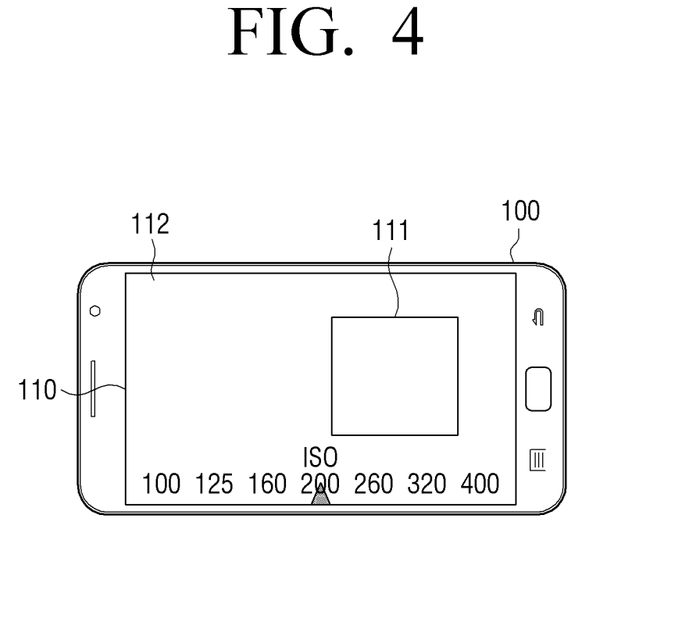
FIGS. 4 through 6 are views illustrating a user interface (UI) for performing a user input for applying a capturing option value to a selected area of a display unit, according to various exemplary embodiments.
Figure 5:
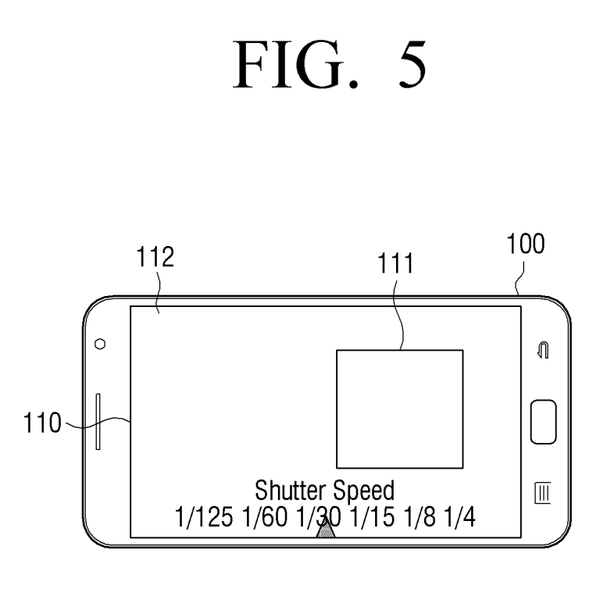
Figure 6:
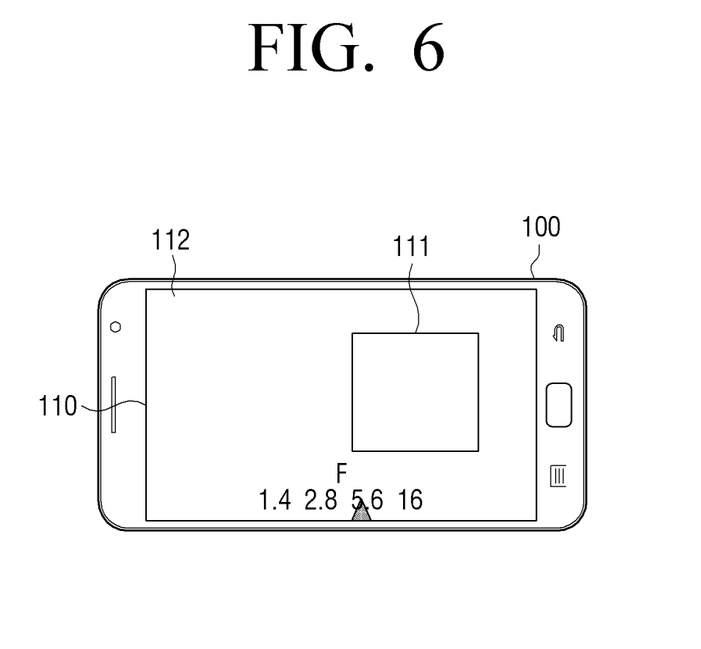

FIGS. 4 through 6 are views illustrating a UI for performing a user input for applying a capturing option value to a selected area of a display unit, according to various exemplary embodiments. The UI is used for discriminating the selected area and the other area of the live view displayed by the display unit 110.

FIG. 4 is a view illustrating a UI for performing a user input for setting an ISO value with respect to a selected area 111 of the display unit 110, according to an exemplary embodiment. The user may set a different ISO value from an ISO value set for an other area 112, with respect to the area 111 of the display unit 110 selected through the UI.

FIG. 5 is a view illustrating a UI for performing a user input for setting a shutter speed with respect to the selected area 111 of the display unit 110, according to an exemplary embodiment. The user may set a different shutter speed from a shutter speed set for the other area 112, with respect to the area 111 of the display unit 110 selected through the UI.

FIG. 6 is a view illustrating a UI for performing a user input for setting an aperture value with respect to the selected area 111 of the display unit 110, according to an exemplary embodiment. The user may set a different aperture value from an aperture value set for the other area 112, with respect to the area 111 of the display unit 110 selected through the UI.

A capturing option value that is set to default may be applied to the other area 112 of the display unit 110 except the selected area 111 of the display unit 110, but may be separately set. In other words, the input unit 120 may receive a user input for applying a capturing option value to the other area 112 of the display unit 110, and the controller 130 may control such an operation of the input unit 120. For example, as shown in FIG. 5, an aperture value of the other area 112 may be set to 15, and an aperture value of the selected area 111 of the display unit 110 may be set to 2.8.

The user may select the area 111 of the display unit 110 through the input unit 120 by using various methods.

Figure 7:
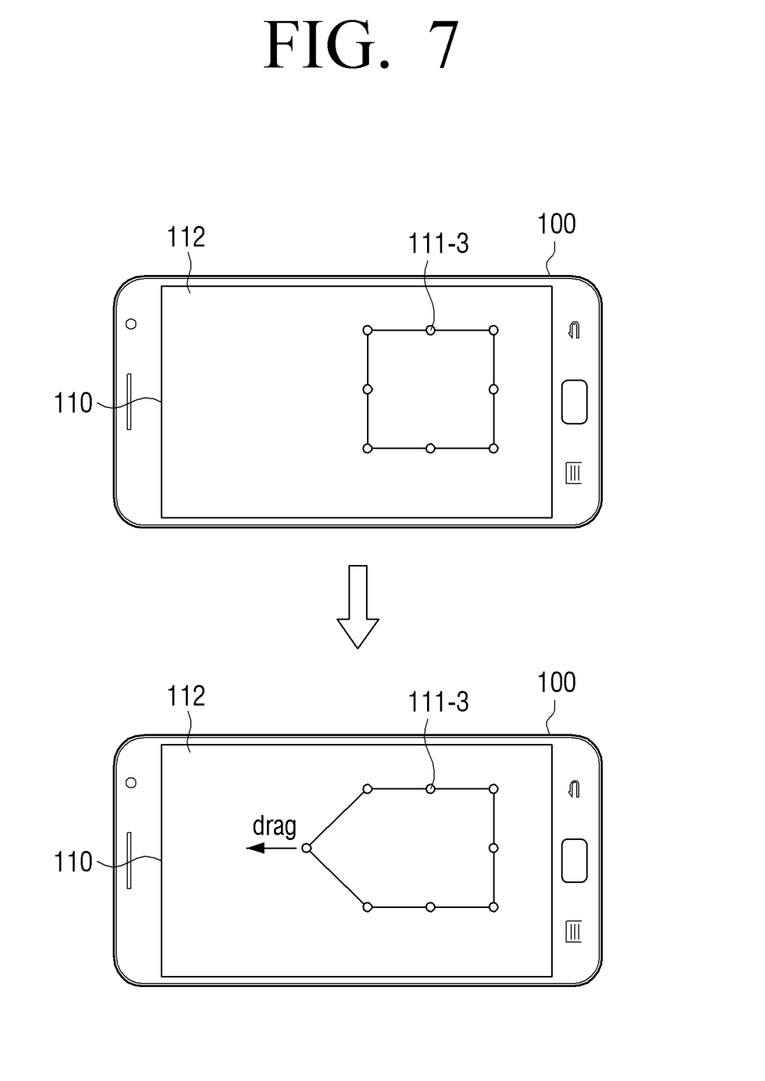
FIG. 7 is a view illustrating a method of selecting an area of a display unit, according to an exemplary embodiment.

FIG. 7 is a view illustrating a method of selecting an area of a display unit, according to an exemplary embodiment.

The input unit 120 may receive a touch input for a first area of the display unit 110 and receive a drag input that is performed from the first area to a second area of the display unit 110. Here, the controller 130 may set an area of the display unit 110, including the first and second areas, to an area to which a different capturing option value from a capturing option value applied to the other area of the display unit 110 will be applied.

The user touches a point inside a box illustrated in an upper view of FIG. 7, and thus a line connects a plurality of dots to form an area 111-3 having a rectangular shape as shown in the upper view of FIG. 7. If the user starts dragging from a point including one of the plurality of dots, a dot of the point at which dragging is performed is moved along a drag direction, and thus a polygon having a modified shape is formed. A lower view of FIG. 7 illustrates the polygon having the modified shape.

If dragging is ended, an area of the display unit 110 is divided into a polygonal area 111-3 having a modified shape and an other area 112 except the polygonal area 111-3. Also, the controller 130 applies different capturing option values to the polygonal area 111-3 and the other area 112 to generate an image.

Figure 8:
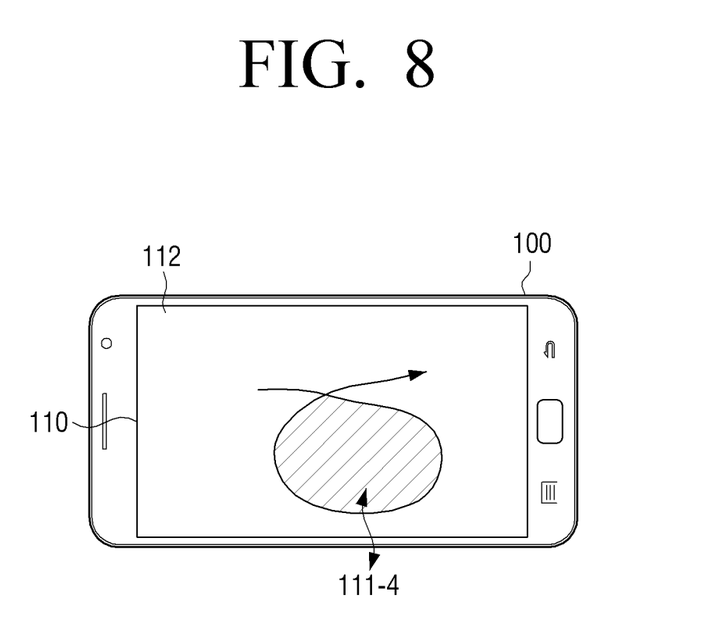
FIG. 8 is a view illustrating a method of selecting an area of a display unit, according to another exemplary embodiment.

FIG. 8 is a view illustrating a method of selecting an area of a display unit, according to another exemplary embodiment.

The input unit 120 may receive a drag input for the display unit 110. The controller 130 may set an area having a looped curve shape or a polygonal shape to an area to which a different capturing option value from a capturing option value applied to an other area of the display unit 110 will be applied, through the drag input.

Referring to FIG. 8, the user may perform the drag input in a direction indicated by an arrow in the display unit 110. If a start point and an end point of the drag input meet, i.e., the drag input forms a looped curve or draws a polygonal shape, the area of the display unit 110 is divided into an internal area 111-4 generated by the drag input and an other area 112. Also, the controller 130 applies different capturing option values to the internal area 111-4 and the other area 112 to perform capturing.

A process of synthesizing areas to which different capturing option values are applied will now be described.

Figure 9:
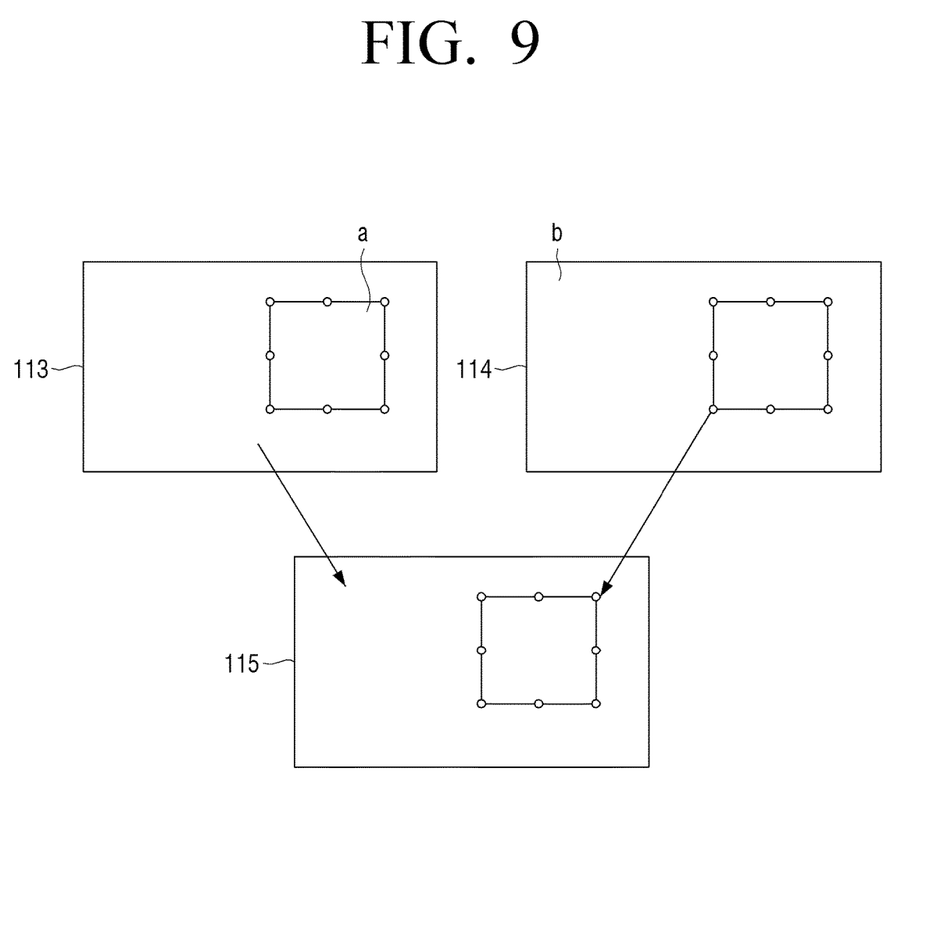
FIG. 9 is a reference view illustrating a process of synthesizing areas to which different capturing option values are applied, according to an exemplary embodiment.

FIG. 9 is a reference view illustrating a process of synthesizing areas to which different capturing option values are applied, according to an exemplary embodiment.

If a capturing input is received, the controller 130 applies a first capturing option value to capture an image according to the above-described method and removes an other area of the display unit 110 from the image to which the first capturing option value is applied, to generate a first image. The controller 130 also applies a second capturing option value to capture an image and removes a selected area of the display unit 110 from the image to which the second capturing option value is applied, to generate a second image. Also, the controller 130 synthesizes the first and second images.

Referring to FIG. 9, if the capturing input is received, a first capturing option value is applied to capture a whole area 114, and an other area b of the display unit 110 is removed from the whole image 114 to which the first capturing option value is applied, to generate a first image.

A second capturing option value is applied to capture a whole image 113, and a selected area a of the display unit 110 is removed from the whole area 113 to which the second capturing option value is applied, to generate a second image.

Also, the first and second images are synthesized (115).

The controller 130 includes a central processing unit (CPU), a hardware configuration such as a cache memory or the like, an operating system (OS), and a software configuration of an application performing a particular object. Control commands for respective elements for performing operations that are described above or will be described later may be read from a memory according to a system clock. An electric signal is generated according to the read control commands to operate components of hardware. The controller 130 may further include a circuit structure that will be described later according to an exemplary embodiment.

Although not shown in the drawings, the image photographing apparatus 100 includes necessary elements of a general electronic computer. In other words, the image photographing apparatus 100 includes a CPU having sufficient control and operation abilities, a large capacity auxiliary storage device such as a cache memory, a random access memory (RAM), a hard disk, or BLU-RAY disk (BD), various types of wired and wireless communication modules including a short-range communication module, a high definition multimedia interface (HDMI), etc., a hardware configuration such as a bus or the like, an application performing the above-described function of the controller 130, a framework, and an OS.

In particular, a storage unit (not shown) is an element that stores a captured image. In other words, the storage unit stores an image frame constituting a live view image or stores a still image. In this case, the storage unit may convert the captured image into a format that may be efficiently stored and store the captured image having the format. The storage unit may be realized as various technologies, for example, may be realized as a memory, a hard disk drive (HDD), a BD, or the like. In particular, a nonvolatile memory such as an electrically erasable and programmable read only memory (EEPROM) may be used to store a captured image in order to process the captured image.

Image photographing methods according to various exemplary embodiments will now be described.

Figure 10:
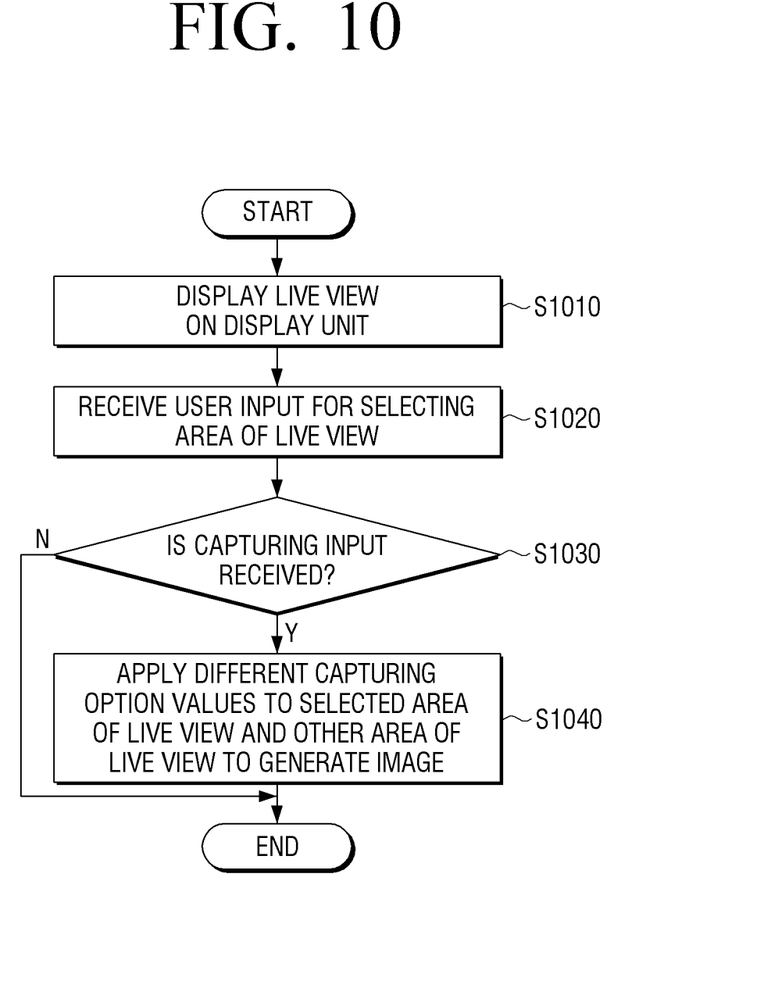
FIGS. 10 and 11 are flowcharts of image photographing methods, according to various exemplary embodiments.
Figure 11:
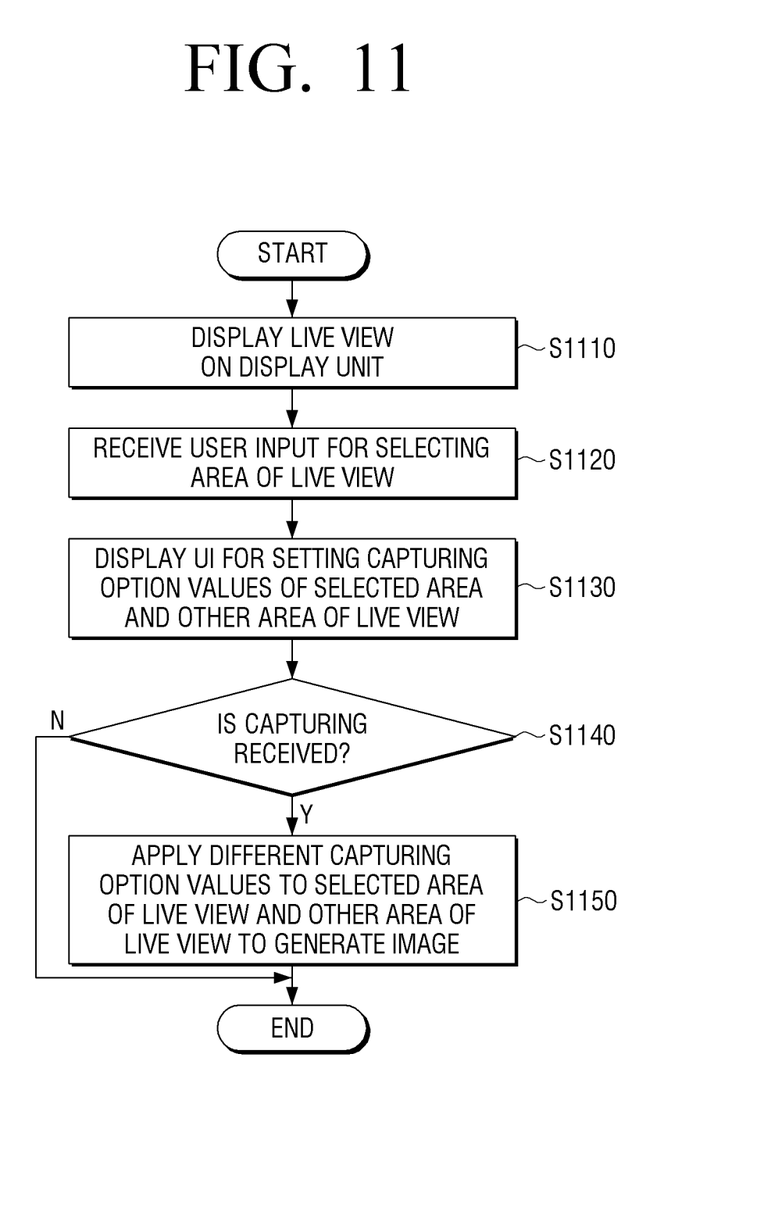

FIGS. 10 and 11 are flowcharts of image photographing methods, according to various exemplary embodiments. While the exemplary image photographing methods relate to a live view displayed on a display unit, in various embodiments the methods may also be applied to an original image other than a live view displayed on a display unit.

Referring to FIG. 10, in operation S1010, a live view is displayed on a display unit. In operation S1020, a user input for selecting an area of the live view is received. In operation S1030, a determination is made as to whether a capturing input is received. If the capturing input is received in operation S1030, different capturing option values are applied to the selected area of the live view and an other area of the live view to generate an image in operation S1040.

Referring to FIG. 11, in operation S1110, a live view is displayed on a display unit. In operation S1120, a user input for selecting an area of the live view is received. In operation S1130, a UI for setting the capturing option values with regard to the selected area and the other area of the live view is displayed. A user input for applying the capturing option values to the selected area and the other area of the live view may be received. In operation S1140, a determination is made as to whether a capturing input is received. If the capturing input is received in operation S1140, different capturing option values are applied to the selected area of the live view and an other area of the live view to generate an image in operation S1150. In this way, image capturing may be performed.

Also, a capturing option value may be at least one of a shutter speed, an aperture value, and an ISO value.

The operation of receiving the user input for selecting the area of the live view may include: receiving a touch input for a first area of the live view; receiving a drag input that is performed from the first area to a second area of the live view; and setting an area of the live view including the first and second areas to an area to which a different capturing option value from a capturing option value applied to an other area of the live view will be applied.

The operation of receiving the user input for selecting the area of the live view may also include: receiving a drag input for the live view; and setting an area that is formed in a looped curve shape or a polygonal shape by the drag input, to an area to which a different capturing option value from a capturing option value applied to the other area of the live view will be applied.

The operation of performing the capturing may include: if the capturing input is received, applying a first capturing option value to capture an image and removing an other area of the live view from the image to which the first capturing option value is applied, to generate a first image; applying a second capturing option value to capture an image and removing the selected area of the live view from the image to which the second capturing option value is applied, to generate a second image; and synthesizing the first and second images.

According to various exemplary embodiments as described above, an image photographing method and an image photographing apparatus may apply different capturing option values to respective areas of a captured image. Therefore, a user may further actively create a desired capturing scene.

A program code for performing an image photographing method according to various exemplary embodiments of the present general inventive concept as described above may be stored on a non-transitory computer readable medium. The non-transitory computer readable medium refers to a medium which does not store data for a short time such as a register, a cache memory, a memory, or the like but semi-permanently stores data and is readable by a device. In detail, the above-described various applications or programs may be stored and provided on a non-transitory computer readable medium such as a CD, a DVD, a hard disk, a BLU-RAY disc, a universal serial bus (USB), a memory card, a ROM, or the like.

The image photographing method may be installed in an embedded software format in a hardware integrated circuit (IC) or may be provided in a firmware format.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a computer-readable media such as non-transitory magnetic storage media (e.g., magnetic tapes, hard disks, floppy disks), non-transitory optical recording media (e.g., CD-ROMs, Digital Versatile Discs (DVDs), etc.), and non-transitory solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An image photographing method comprising:
   displaying a live view;
   receiving a user input for selecting an area of the live view;
   in response to a capturing input, (i) applying different capturing option values to the selected area of the live view and another area of the live view to generate an image;
   (ii) performing capturing using the applied different capturing option values,
   wherein the performing of the capturing comprises:
      in response to the capturing input being received:
         applying a first capturing option value to capture an image and removing the other area of the live view from the image to which the first capturing option value is applied, to generate a first image;
         applying a second capturing option value to capture an image and removing the selected area of the live view from the image to which the second capturing option value is applied, to generate a second image; and
   (iii) synthesizing the first and second images.

2. The image photographing method of claim 1, further comprising displaying a user interface (UI) for setting the capturing option values with regard to the selected area and the other area of the live view.

3. The image photographing method of claim 1, wherein the capturing option values comprise at least one option value selected from the group consisting of a shutter speed, an aperture value, and an International Organization for Standardization (ISO) value.

4. The image photographing method of claim 1, further comprising displaying a user interface (UI) for discriminating the selected area and the other area of the live view.

5. The image photographing method of claim 1, wherein the receiving of the user input for selecting the area of the live view comprises:
   receiving a touch input for a first area of the live view;
   receiving a drag input that is performed from the first area to a second area of live view; and
   setting an area of the live view, comprising the first and second areas, to an area to which a different capturing option value from a capturing option value applied to the other area of the live view is applied.

6. The image photographing method of claim 1, wherein the receiving of the user input for selecting the area of the live view comprises:
   receiving a drag input for the live view; and
   setting an area, which is formed in a looped curve shape or a polygonal shape by the drag input, to an area to which a different capturing option value from a capturing option value applied to the other area of the live view is applied.

7. An image photographing apparatus comprising:
   a display unit that displays a live view;
   an input unit that receives a user input for selecting an area of the live view;
   a controller that, in response to a capturing input,
      applies different capturing option values to the selected area of the live view and another area of the live view to generate an image;
      applies a first capturing option value to capture an image;
      removes the other area of the live view from the image to which the first capturing option value is applied, to generate a first image;
      applies a second capturing option value to capture an image;
      removes the selected area of the live view from the image to which the second capturing option value is applied, to generate a second image; and
      synthesizes the first and second images.

8. The image photographing apparatus of claim 7, wherein the controller controls the display unit to display a user interface (UI) for setting the capturing option values with regard to the selected area and the other area of the live view.

9. The image photographing apparatus of claim 7, wherein the capturing option value comprises at least one option value selected from the group consisting of a shutter speed, an aperture value, and an International Organization for Standardization (ISO) value.

10. The image photographing apparatus of claim 7, wherein the controller controls the display unit to display a user interface (UI) for discriminating the selected area and the other area of the live view.

11. The image photographing apparatus of claim 7, wherein:
   the input unit receives a touch input for a first area of the live view and receives a drag input that is performed from the first area to a second area of the live view; and
   the controller sets an area of the live view, comprising the first and second areas, to an area to which a different capturing option value from a capturing option value applied to the other area of the live view is applied.

12. The image photographing apparatus of claim 7, wherein:
   the input unit receives a drag input for the display unit; and
   the controller sets an area, which is formed in a looped curve shape or a polygonal shape by the drag input, to an area to which a different capturing option value from a capturing option value applied to the other area of the live view is applied.

13. A non-transitory recording medium having recorded thereon a program for performing an image photographing method, the method comprising:
   displaying a live view;
   receiving a user input for selecting an area of the live view;
   in response to a capturing input, (i) applying different capturing option values to the selected area of the live view and another area of the live view to generate an image;
   (ii) performing capturing using the applied different capturing option values,
   wherein the performing of the capturing comprises:
      in response to the capturing input being received:
         applying a first capturing option value to capture an image and removing the other area of the live view from the image to which the first capturing option value is applied, to generate a first image;
         applying a second capturing option value to capture an image and removing the selected area of the live view from the image to which the second capturing option value is applied, to generate a second image; and
   (iii) synthesizing the first and second images.

14. The recording medium of claim 13, the method further comprising displaying a user interface (UI) for setting the capturing option values with regard to the selected area and the other area of the live view.

15. The recording medium of claim 13, wherein the capturing option values comprise at least one option value selected from the group consisting of a shutter speed, an aperture value, and an International Organization for Standardization (ISO) value.

16. The recording medium of claim 13, the method further comprising displaying a user interface (UI) for discriminating the selected area and the other area of the live view.

17. The recording medium of claim 13, wherein the receiving of the user input for selecting the area of the live view comprises:
- receiving a touch input for a first area of the live view;
- receiving a drag input that is performed from the first area to a second area of live view; and
- setting an area of the live view, comprising the first and second areas, to an area to which a different capturing option value from a capturing option value applied to the other area of the live view is applied.

18. The recording medium of claim 13, wherein the receiving of the user input for selecting the area of the live view comprises:
- receiving a drag input for the live view; and
- setting an area, which is formed in a looped curve shape or a polygonal shape by the drag input, to an area to which a different capturing option value from a capturing option value applied to the other area of the live view is applied.

* * * * *